United States Patent [19]

Konrad

[11] 4,377,081
[45] Mar. 22, 1983

[54] BELT SURFACING TOOL

[76] Inventor: Joseph D. Konrad, 6340 Stumph Rd., Cleveland, Ohio 44130

[21] Appl. No.: 195,393

[22] Filed: Oct. 9, 1980

[51] Int. Cl.³ .............................................. C14B 1/44
[52] U.S. Cl. .................................................... 69/6.5
[58] Field of Search ........................................... 69/6.5

[56] References Cited
U.S. PATENT DOCUMENTS 3,449,933  6/1969  Dunlap et al. ........................ 69/6.5

Primary Examiner—Patrick D. Lawson
Attorney, Agent, or Firm—Henn and Cain

[57] ABSTRACT

An endless-belt surfacing tool is disclosed, consisting of a perforated metal sheet with burrs formed by the perforations, the sheet being welded to form a belt, where the weld is made on the same side of the sheet as the burrs formed by the perforations, the height of the weld being less than that of the burrs, and where the ends of the belt are welded at an angle to the length of the belt.

9 Claims, 3 Drawing Figures

BELT SURFACING TOOL

BACKGROUND OF THE INVENTION

1. Field of the Invention

This invention is in the field of devices for finishing surfaces; more specifically, this invention is in the field of abrading means for belt sanders and the like.

2. Description of the Prior Art

In my U.S. Pat. No. 4,028,781, I disclose and claim a metal sheet having perforations therein, the sheet being useful in place of sandpaper for reciprocal and orbital sanding machines. While such a sheet has utility and a much greater durability and life than conventional sandpaper or emery cloth, it is by its very nature restricted to the general line of machines which provide a reciprocating motion, and obviously cannot be used on a belt sander.

There have been other attempts to provide abrasive means useful with a rotary application. Bertrand, in U.S. Pat. No. 1,789,298, shows an abrading strip helically wound on a drum, the ends of the strip being secured to the drum at the ends thereof in such a fashion that the surface of the drum is effectively covered with the strip. By this arrangement, the drum can be used as an abrading device operating in the rotational mode as opposed to the reciprocal. Bertrand, however, has no provision for the application of any part of the abrading surface in the planar conformation, the strip conforming to the curved drum surface.

Caston, in U.S. Pat. No. 2,518,448, makes provision for both a rotary application and the possibility of applying a planar portion of the device to the work. Caston discloses an endless belt made of flexible steel, being carried between two drums, whereby either a planar or a curvilinear surface may be presented to the work. There is no disclosure in the '448 patent, however, of the nature of the joinder of the ends of the original metal band to form the endless belt.

In using endless metal belts, one problem which has been observed is that the weld area causes the belt surface to rise in relation to the drum as that area of the belt passes over the drum. In the planar portion of the belt, the problem is not so acute, but a different problem arises when the weld line is perpendicular to the direction of travel of the belt, that problem being that there is a gap in the abrading surface.

SUMMARY OF THE INVENTION

The present invention is an endless-belt abrading tool consisting of a metal sheet from about 0.2 to about 5 millimeters (mm) thick, perforated with punched holes, the burrs from the punching forming an abrasive surface. The total area of the perforations is not greater than one-half of the total area of the original sheet surface. The ends of the sheet are joined by a butt weld where the welding operation is performed on the burr side of the sheet, the weld line being at an angle to the direction of travel of the finished belt, the height of the weld being less than the height of the burrs.

DESCRIPTION OF THE PREFERRED EMBODIMENTS

The preferred embodiment of the present invention consists of a metal belt of a thickness from about 2 to about 5 mm. The sheet from which the belt is made is perforated with punched holes whereby the burrs from the punching operation form an abrasive surface. The total area of the punched holes or perforations must be no greater than the total area of the remaining non-perforated metal, preferably no greater than about one-half the total area of non-perforated metal, and the distance between the edge of any given perforation and any other edges such as the nearest perforations or the edge of the metal sheet is no less than about 0.75 times the smallest lateral dimension, e.g., diameter of the smaller of the two perforations, nor more than about four times the minimum lateral dimension of the larger of the two perforations. The minimum lateral dimension of any perforation is about 0.75 mm, and the maximum lateral dimension of any perforation is about 4 mm. Preferably, these lateral dimensions range from about 1.5 to about 2.5 mm, and the length of each of the burrs surrounding said perforations is in the range of from about 0.75 to about 3 mm, more preferably from about 1.5 to about 2.5 mm. Preferably, all the perforations are substantially the same size, and the areas of the perforations range from about 0.5 to about 12 square mm.

Figure 1:
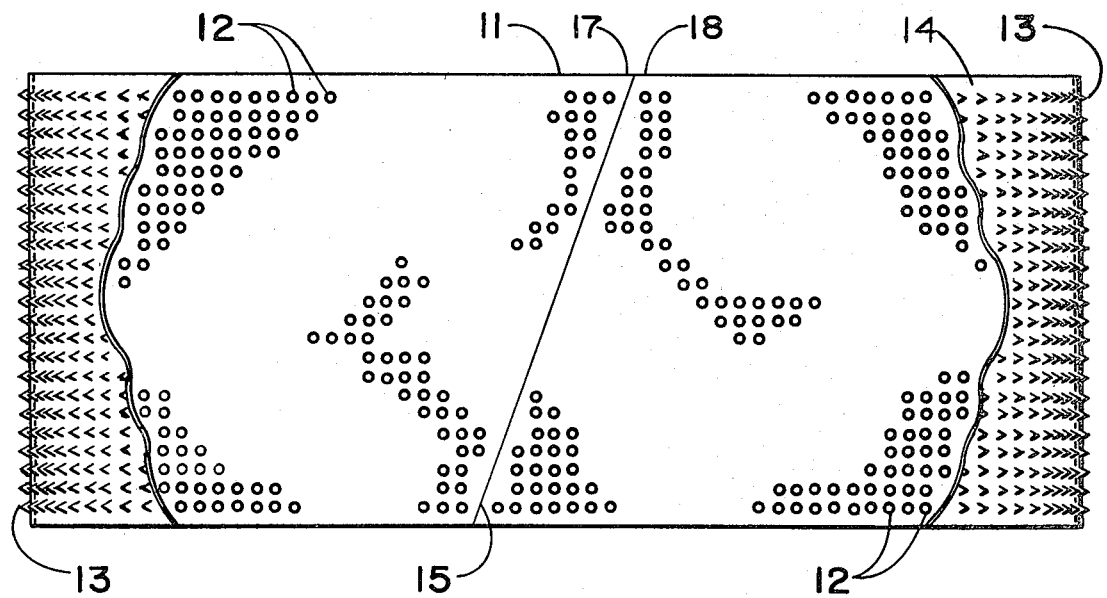
FIG. 1 is partially cut-away plan view of the belt of the present invention.

FIG. 1 shows the belt of the present invention, partially cut away to show the features of the invention. Belt 11 is formed of a material capable of being punched or otherwise worked to produce holes 12, where the edges of the holes then become burrs 13 which collectively make an abrasive surface. Metal is a convenient material, with steel being preferred, and stainless steel being most preferred. Holes 12 are punched in such a manner as to provide burrs 13 oriented all in one direction on surface 14 of belt 11. Holes 12 are shown as circular, but can as well be elliptical, polygonal or irregular.

The manner of piercing or punching belt 11 is well known to those skilled in the art, and forms no part of this invention as such. Such operations include, e.g., die punching, explosive methods, and electric-arc piercing.

The ends 17 and 18 of belt 11 are joined at weld line 15 to produce an endless belt. Those skilled in the art will realize that the joinder must be made with ends 17 and 18 juxtaposed to permit belt 11 to run true on a plurality of drums or other rotational means.

Figure 2:
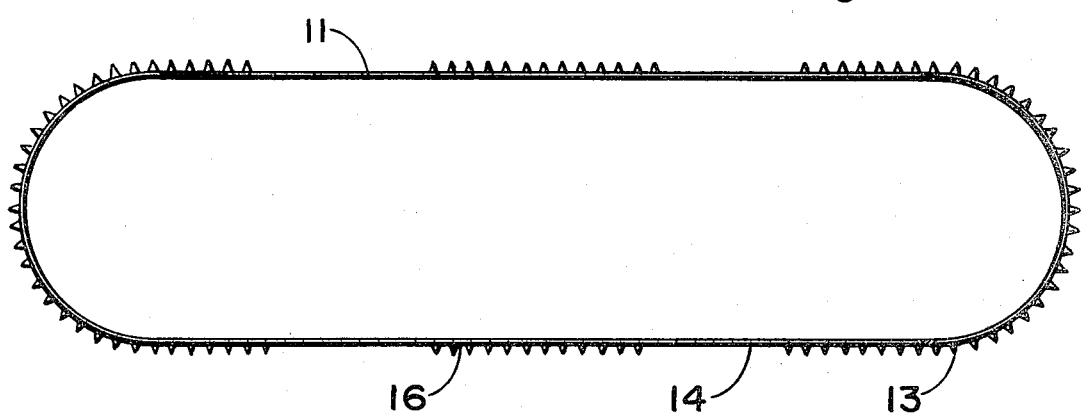
FIG. 2 is a side view of the belt.

FIG. 2 shows belt 11 in a side view, the belt having been formed into an endless belt. Weld 16, shown in more detail in FIG. 3, is made on the side of surface 14 of the belt, the same side as the protrusion of burrs 13.

Figure 3:
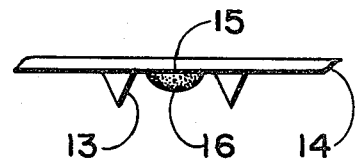
FIG. 3 is an enlarged view of the burrs formed by the punching operation, and of the weld area.

FIG. 3 is an enlargement of the view at reference character 16, showing the weld 16 in greater detail. The belt is welded at line 15 by any means known to those skilled in the art, such as, e.g., automatic arc or resistance welding, which means form no part of this invention. However, it is important to the proper operation of the belt that the weld 16 produce no impediment to the abrading function of the belt for a substantial portion of the life of the belt. Therefore, the weld 16 must have no material projecting from surface 14 more than the length of the shortest burr, or about 0.3 mm, and preferably not more than about half that amount.

To prevent irregular motion of the belt around a drive or idler drum, such as found in a drum sander or the like, no weld metal may be deposited on the interior surface of the belt, where such additional material would produce a hump on the belt surface. That is to say, the interior surface of the belt must be without substantial irregularity.

Referring again to FIG. 1, weld line 15 is shown as being at an angle to the length of the belt. If line 15 is perpendicular to the length of belt 11, too much stress is imparted to weld 16, causing unacceptably early fatigue failure of the weld, or of the material close to it, due to excessive flexing. Further, because of the physical necessity of access to the weld line of the equipment used to perform the welding function, there is necessarily a gap in the burrs in that area. By joining ends 17 and 18 at an angle to the length of the belt, stress on the weld line is reduced, and the effective region of decreased burrs is spread over a larger area when the belt is in use.

Those skilled in the art will realize that the belt 11 herein described can be formed initially in a belt configuration without any seam or weld, by extruding, drawing or other convenient operation to produce the belt, which is then made of the lateral dimension desired by appropriate means such as cutting. The formation of the burrs 13 is then accomplished by means such as described herein.

The angle formed by line 15 and the long line of the belt shown in FIG. 1 is 70°, and is a preferred angle for joinder. However, angles of from about 30° to about 80° are useful, and within the spirit and scope of this invention.

In the embodiment shown in FIG. 1, circular perforations of about 2 mm in diameter have been punched in a substantially rectangular pattern spaced on about 4.5-mm centers, with no perforations closer than about 2.5 mm to any edge of the belt, either before or after weld 16 is made. In this fashion, the holes made in the belt comprise about 30 percent of the total belt surface. The total area of the holes in belt 11 preferably comprise less than about half of the total area of the belt, to resist distortion and stretching.

If 4-mm holes are punched in the belt rows having axes at about 60 to the length of the belt, with about 6 mm between centers, the area of the holes comprises about 45 percent of the total area. As described hereinabove, no hole should have its center closer than about 2.5 mm to the edge of the belt, in order to avoid tearing the belt. The arrangement of holes in rows at 60° to the length of the belt is preferred, providing the greatest amount of abrading surface consistent with belt integrity.

The thickness of the belt is necessarily dependent upon the material from which it is made. If the belt is formed from stainless steel, the practical minimum is about 0.2 mm. If it is greater than about 0.5 mm, the material appears to be too stiff for practical utility as an abrading belt.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A surfacing tool comprising an endless belt consisting of a sheet having holes therein and burrs projecting therefrom, said burrs all projecting from one side of said belt, the total area of said holes being not greater than about one-half of the total surface area of said belt.

2. The tool of claim 1 wherein said sheet is stainless steel.

3. The tool of claim 1 wherein said endless belt is formed by butt-welding ends of said sheet to produce a weld line, said weld line being at an angle of from about 30° to about 80° to the length of said belt and on the same side of said belt as said burrs, the height of said weld being less than the length of said burrs.

4. The tool of claim 2 wherein said holes are produced by punching.

5. The tool of claim 2 wherein said holes are formed on about 4.5 mm centers, none of said holes being closer than about 2.5 mm to any edge of said belt.

6. The tool of claim 2 wherein said holes are in an ordered pattern.

7. The tool of claim 2 wherein said holes are in rows having axes at about 60° to the length of the belt.

8. The tool of claim 2 wherein the belt is from about 0.2 to about 0.5 mm in thickness.

9. The tool of claim 2 wherein the length of said burrs is from about 0.75 to about 3 mm.

* * * * *